(12) United States Patent
Burdock et al.

(10) Patent No.: US 6,419,240 B1
(45) Date of Patent: Jul. 16, 2002

(54) VEHICLE ROLL CONTROL

(75) Inventors: William Burdock, Sutton Coldfield; David Andrew Clare, Banbury, both of (GB)

(73) Assignee: Land Rover, Warwick (GB)

( * ) Notice: Subject to any disclaimer, the term of this patent is extended or adjusted under 35 U.S.C. 154(b) by 0 days.

(21) Appl. No.: 09/806,176

(22) PCT Filed: Sep. 20, 1999

(86) PCT No.: PCT/GB99/03125

§ 371 (c)(1),
(2), (4) Date: Mar. 27, 2001

(87) PCT Pub. No.: WO00/18596

PCT Pub. Date: Apr. 6, 2000

(30) Foreign Application Priority Data

Sep. 29, 1998 (GB) ............................................. 9821064

(51) Int. Cl.$^7$ ............................................... B60G 17/01
(52) U.S. Cl. .............................. 280/5.508; 280/124.106
(58) Field of Search ............................ 280/5.508, 5.51, 280/5.54, 124.106, 124.107

(56) References Cited

U.S. PATENT DOCUMENTS

| 4,801,155 A | | 1/1989 | Fukushima et al. | |
| 4,852,903 A | | 8/1989 | Tanaka et al. | |
| 4,903,982 A | * | 2/1990 | Harara et al. | 280/5.502 |
| 4,903,983 A | * | 2/1990 | Fukushima et al. | 280/5.503 |
| 4,927,173 A | * | 5/1990 | Clifton, Jr. | 180/271 |
| 4,930,082 A | * | 5/1990 | Harara et al. | 280/5.51 |
| 4,953,890 A | * | 9/1990 | Kamimura | 280/124.106 |
| 4,986,388 A | * | 1/1991 | Matsuda | 180/233 |
| 4,989,466 A | * | 2/1991 | Goodman | 352/243 |
| 5,072,392 A | | 12/1991 | Taniguchi | |
| 5,362,094 A | * | 11/1994 | Jensen | 280/124.107 |
| 5,381,335 A | * | 1/1995 | Wolf | 280/5.51 |
| 5,422,810 A | * | 6/1995 | Brunning et al. | 180/421 |
| 5,430,647 A | * | 7/1995 | Raad et al. | 180/41 |
| 5,481,459 A | * | 1/1996 | Bungeler | 280/124.106 |
| 5,487,006 A | | 1/1996 | Kakizaki et al. | |
| 5,510,986 A | * | 4/1996 | Williams | 701/38 |
| 5,510,989 A | * | 4/1996 | Zabler et al. | 701/1 |
| 5,513,108 A | * | 4/1996 | Kishimoto et al. | 280/5.51 |
| 5,519,611 A | | 5/1996 | Tagawa et al. | |

FOREIGN PATENT DOCUMENTS

| DE | 196 32 363 C1 | 1/1998 |
| EP | 0 285 153 | 3/1988 |
| EP | 0 415 423 A1 | 8/1991 |
| EP | 0 769 396 A2 | 10/1996 |
| GB | 2 214 473 | 9/1989 |
| GB | 2 284 184 | 5/1995 |
| JP | 04015115 | 1/1992 |
| JP | 04055109 | 2/1992 |
| JP | 04231205 | 8/1992 |
| JP | 04300708 | 10/1992 |
| JP | 07232528 | 9/1995 |

* cited by examiner

*Primary Examiner*—Paul N. Dickson
*Assistant Examiner*—Paul Royal, Jr.
(74) *Attorney, Agent, or Firm*—Davis & Bujold, P.L.L.C.

(57) ABSTRACT

A vehicle roll control system is disclosed in which a pair of vertically spaced lateral accelerometers (28, 30) are used to measure lateral acceleration as well as vehicle body roll and to measure cornering acceleration by measuring the lateral acceleration not produced by body roll.

6 Claims, 2 Drawing Sheets

VEHICLE ROLL CONTROL

FIELD OF THE INVENTION

The present invention relates to active suspension systems for vehicles, and in particular to such systems which include active roll control.

BACKGROUND OF THE INVENTION

It can be a problem with active suspension control systems that whilst cornering of the vehicle and roll of the vehicle both produce lateral accelerations, the respective responses required from the suspension system are quite different. There is therefore a need for rapid and accurate measurement of true cornering acceleration thereby allowing the suspension control system to respond in the desired manner. Similarly, accurate determination of the amount of lateral acceleration due to cornering allows accurate determination of the amount of lateral acceleration due to other causes, for example 'rock-roll' which is a motion induced by roughness in the surface over which the vehicle is traveling and comprises rotation about a longitudinal axis of the vehicle, generally at a higher frequency than that of cornering-induced body roll. This in turn allows the correct control of the suspension to take account of the rough surface producing the rock-roll type motion.

It is known form U.S. Pat. No. 4,852,903 to provide an active suspension system in which a lateral accelerometer is used to measure lateral acceleration, and wheel height sensors are used to measure roughness in the road surface. The response of the system to measured lateral acceleration is modified of the wheel height sensors determine that the vehicle is traveling on a rough road because it is assumed that this is contributing a high frequency component to the lateral acceleration.

It is a problem with this system that separate systems are required for measuring lateral and vertical acceleration, and the effect of a rough road on measured lateral acceleration can only be very roughly estimated.

SUMMARY OF THE INVENTION

The present invention provides apparatus for measuring vehicle movement including a first accelerometer for measuring the lateral acceleration at least one point on the vehicle so that they measure different accelerations during roll movements of the vehicle, and control means arranged to measure lateral acceleration using the first accelerometer, to measure vehicle roll using the two accelerometers, and to measure vehicle cornering on the basis of the component of the lateral acceleration which is not due to vehicle roll.

The present invention further provides apparatus for measuring vehicle movement including roll measuring means for measuring roll movements of the vehicle, and also including lateral acceleration measuring means for measuring the lateral acceleration at least one point on the vehicle, and control means arranged to determine the amount of body roll which is not caused by cornering.

The present invention further provides a vehicle suspension system comprising apparatus according to the invention wherein the control means is arranged to control the roll stiffness of the vehicle, wherein the control means is arranged to alter the suspension characteristics, for example by reducing roll stiffness, in response to the detection of vehicle roll movements which are not caused by cornering.

BRIEF DESCRIPTION OF THE DRAWINGS

Preferred embodiments of the present invention will now be described by way of example only with reference to the accompanying drawings in which.

DESCRIPTION OF PREFERRED EMBODIMENTS

Figure 1:
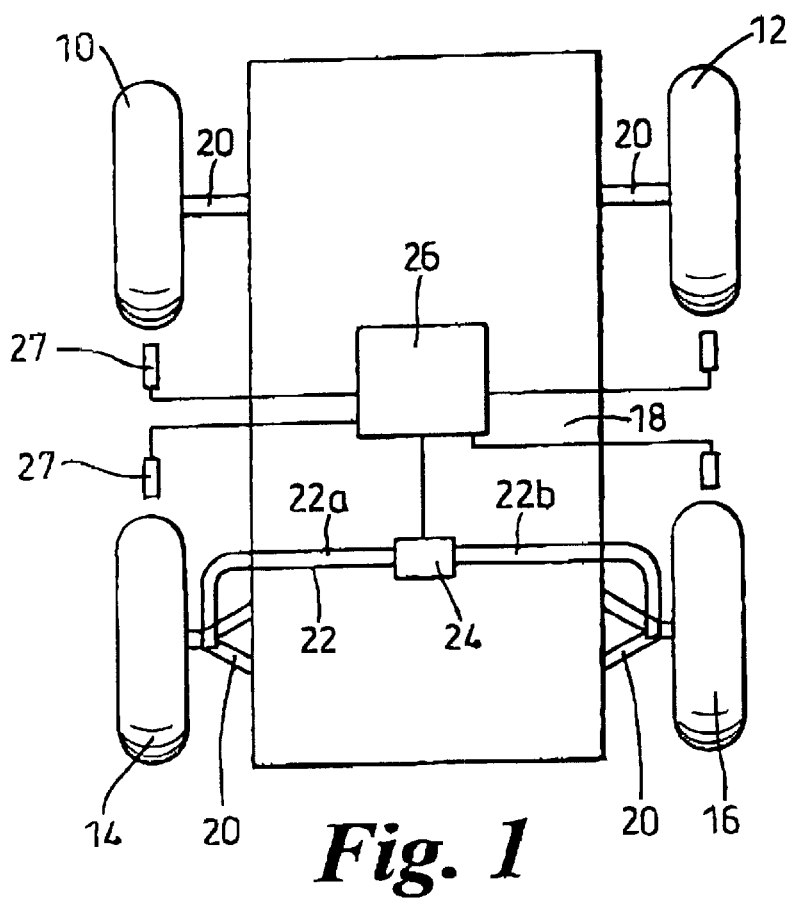
FIG. 1 is a diagrammatic representation of a vehicle including a suspension according to an embodiment of the invention.

Referring to FIG. 1, a vehicle has four wheels 10, 12, 14, 16 each mounted on the vehicle body 18. The vehicle has an independent suspension, each of the wheels being attached to the body 18 through a suspension arm 20 so that it can move vertically relative to the body 18. A roll bar 22 is connected between the two rear wheels 14, 16 to control the roll of the rear of the vehicle. The roll bar 22 is split in the middle into two halves 22a, 22b which can be rotated relative to each other by a rotary actuator 24 under the control of a control unit 26. This enables vehicle roll to be controlled actively in response to signals input to the control unit from wheel speed sensors 27 and a number of linear accelerometers which provide signals indicative of the acceleration of parts of the vehicle body in various directions. A similar roll bar, which is not shown, would also normally be connected between the front wheels 10, 12.

Figure 2:
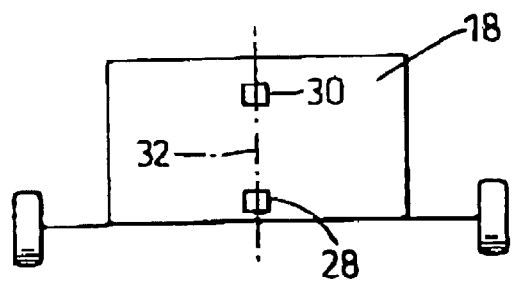
FIGS. 2 and 3 are diagrammatic end views of the vehicle of FIG. 1 when level and when under roll respectively.

Referring to FIG. 2 the accelerometers mentioned above include two lateral accelerometers 28, 30 which are rigidly mounted on the vehicle body 18 and measure lateral acceleration of the vehicle body. The lateral accelerometers 28, 30 are vertically spaced from each other, the lower one 28 being positioned near the roll axis 32 of the vehicle, i.e. the longitudinal axis about which the vehicle tends to rotate during roll movements. The upper accelerometer 30 is mounted near the top of the vehicle body 18 about the roll axis will cause larger lateral movements of the upper accelerometer 30 than of the lower 28.

Figure 4:
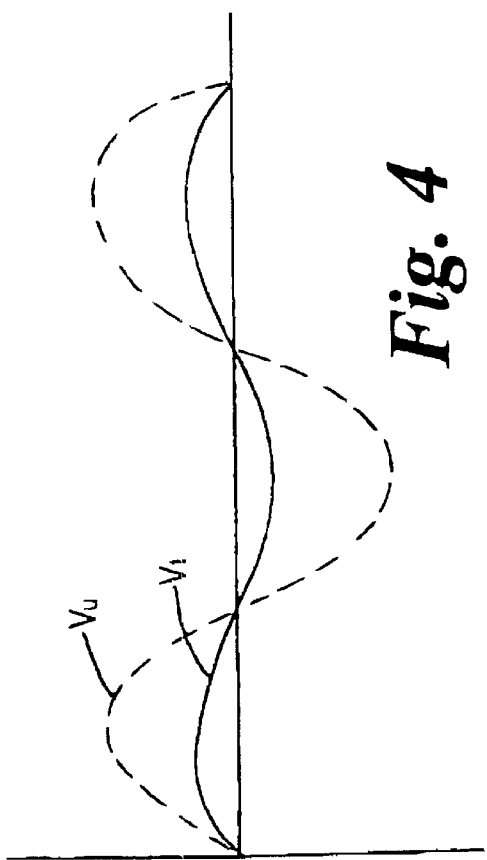
FIG. 4 is a graph showing the output from sensors in the vehicle of FIG. 1 when traveling on a rough road.
Figure 5:
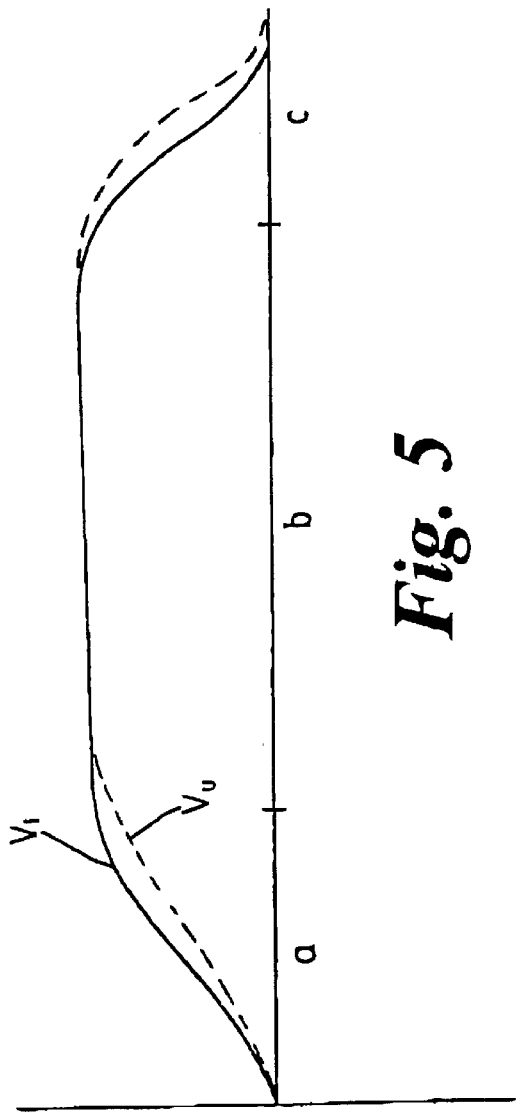
FIG. 5 is a graph showing output from sensors in the vehicle of FIG. 1 when traveling round a corner.

The signals $V_l$, $V_u$ produced by the lower and upper accelerometers 28, 30 under different conditions are shown in FIGS. 4 and 5. FIG. 4 shows the signals produced when the vehicle is traveling over rough ground and the body is undergoing rock-roll motion at relatively high frequencies of the order of 10 Hz. Under these conditions the upper accelerometer 30 will detect relatively high accelerations because the top part of the body which is relatively far from the roll axis, typically 1.0 to 1.5 meters, will be moving through relatively large distances as the body rolls about the roll axis. The lower accelerometer 28, on the other hand, which is closer to the roll axis, say 0.1 or 0.2 meters above it, will detect much lower accelerations because of the smaller lateral displacements it will undergo. However it will be understood that, as shown in FIG. 4, the oscillations in the two signals will be in phase with each other provided the accelerometers are both above the roll axis. (If the lower accelerometer were below the roll axis they would be in anti-phase.) The signals from the two accelerometers can therefore be analyzed by the control unit to determine the amount of vehicle roll.

Figure 3:
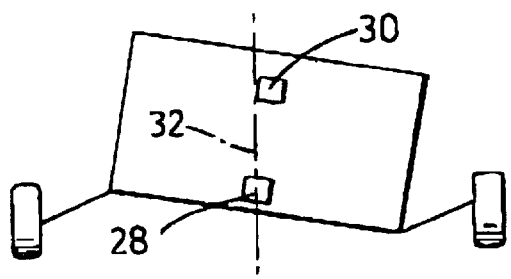

FIG. 5 shows the signals $V_l$, $V_u$ produced by the upper and lower accelerometers 28, 30 when the vehicle is cornering. The cornering move can be considered in three phases. The first phase a is when the vehicle is entering the corner and the vehicle body (assuming no active roll control is present) starts to roll, the second phase b is while the vehicle is going round the corner and the vehicle has settled to a fixed position in roll determined by the roll stiffness of the vehicle, its speed, and the tightness of the corner, and the third phase c is when the vehicle is leaving the corner and its body is returning to the level position. As shown in FIG. 5, in the first phase of the corner the lower accelerometer, the signal $V_l$ from which is indicated by the solid line, and the upper accelerometer, the signal $V_u$ from which is indicated by the dotted line, experience a cornering acceleration which increases with time as the tightness of the corner increases, i.e. as the steering wheels are turned to one side. FIG. 3 shows what might happen in a highly damped system. Because the top of the vehicle body will tend to roll outwards during this phase of the corner, the acceleration of the upper accelerometer will initially lag slightly behind that of the lower accelerometer, but will then catch up as the body reaches a steady state in a fixed position in roll and the cornering radius is constant, i.e. during phase b of the corner. In most systems the damping would be less than this, and the vehicle would oscillate about the steady state cornering position. This would impose an oscillation on top of the signals shown in FIG. 3. If the accelerometers are both above the axis of rotation, the oscillations of the top and bottom accelerometers will be in phase, but of the lower accelerometer is below the axis of rotation they will be in anti-phase. During this phase the cornering acceleration will be essentially the same for the two accelerometers. When the vehicle leaves the corner during phase c the acceleration at the two accelerometers will fall off again, with the upper accelerometer again lagging behind the lower accelerometer slightly due to the damping produced by body roll.

It will be appreciated during travel over rough ground, as shown in FIG. 4, the rate of change of the accelerations measured by the two accelerometers differs quite significantly, whereas during cornering, as shown in FIG. 5, although the actual accelerations measured by the two accelerometers can differ significantly, their rates of change at any one time are similar. This distinction enable the control unit 26 to distinguish between the two types of lateral acceleration: cornering acceleration and roll acceleration. In particular it will be noticed that the distinction can be made very quickly when lateral acceleration starts, the acceleration measured by the upper accelerometer increasing much more rapidly than that measured by the lower accelerometer from the very onset of rough-road induced roll, and the two measured accelerations increasing at similar rates during cornering.

During operation the control means is arranged to monitor the accelerations measured by the accelerometers 28, 30 and to determine the lateral acceleration at one particular point on the vehicle, for example that measured by the lower accelerometer 28. The control unit is also arranged to determine the roll movements, i.e. the angular velocity and angular acceleration about the roll axis from the measured accelerations from the two accelerometers 28, 30. The control unit then determines how much of the lateral acceleration measured by the lower accelerometer is due to vehicle roll movements or rock-roll movements, and deducts this from the total lateral acceleration measured at that point. The remaining component of the lateral acceleration is taken to be due to vehicle cornering and is used as a measure of the cornering acceleration of the vehicle.

The control system is then arranged to control the torque applied to the rotary actuator so as to increase roll stiffness, by opposing the roll of the vehicle, in response to the measured cornering acceleration. The desired response to the measured cornering acceleration is known, for example from our co-pending international patent application No. PCT/GB97/02214, and generally involve increasing the roll stiffness with increasing cornering acceleration. However the details of the control do not form part of this invention

What is claimed is:

1. An apparatus for measuring movement of a vehicle- which has a roll axis, the apparatus including a first accelerometer for measuring lateral acceleration at a first point on the vehicle, a second accelerometer for measuring lateral acceleration at a second point on the vehicle, the first and second points being vertically spaced from each other and at different distances from the roll axis of the vehicle such that there will be a difference between the lateral accelerations measured by the two accelerometers during roll movements of the vehicle, and a controller arranged to measure a lateral acceleration of the vehicle at the first point using the first accelerometer, to measure vehicle roll using said difference of accelerations, to determine a component of the measured lateral acceleration which is not due to vehicle roll, and to determine from said component a measure of cornering of the vehicle.

2. The apparatus according to claim 1, wherein the controller is arranged to determine from the measure of cornering and the measure of vehicle roll, an amount of the measured body roll which is not caused by cornering.

3. A vehicle suspension system including the apparatus according to claim 1, wherein the controller is arranged to control a roll stiffness of the vehicle and is arranged to increase the roll stiffness in response to the detection of vehicle cornering.

4. The vehicle suspension system according to claim 3, wherein the controller is arranged to control suspension characteristics of the vehicle and is arranged to alter the suspension characteristics in response to the detection of vehicle roll movements which are not caused by cornering.

5. An apparatus for measuring movement of a vehicle which has a roll axis, the apparatus including a first accelerometer arranged to produce a first signal indicative of lateral acceleration at a first point on the vehicle, a second accelerometer arranged to produce a second signal indicative of lateral acceleration at a second point on the vehicle, the first and second points being vertically spaced from each other and at different distances from the roll axis of the vehicle such that the two signals will indicate lateral accelerations which differ from each other during roll movements of the vehicle, and a controller arranged to receive the signals, to use the first signal as a measure of lateral acceleration of the vehicle, to use the difference between the signals as a measure of vehicle roll, and thereby to determine from the signals a component of the measured lateral acceleration which is not due to vehicle roll, and to determine from said component a measure of cornering of the vehicle.

6. A vehicle having a roll axis, the vehicle including a first accelerometer for measuring lateral acceleration at a fist point on the vehicle, a second accelerometer for measuring lateral acceleration at a second point on the vehicle, the first and second points being vertically spaced from each other and at different distances from the roll axis of the vehicle such that there will be a difference between the lateral accelerations measured by the two accelerometers during roll movements of the vehicle, and a controller arranged to measure a lateral acceleration of the vehicle at the first point using the first accelerometer, to measure vehicle roll using said difference of accelerations, to determine a component of the measured lateral acceleration which is not due to vehicle roll, and to determine from said component a measure of cornering of the vehicle.

\* \* \* \* \*